United States Patent [19]

Kingsbury et al.

[11] Patent Number: 4,469,501

[45] Date of Patent: Sep. 4, 1984

[54] TIMING CONTROL SYSTEM FOR GLASSWARE FORMING MACHINE

[75] Inventors: Charles M. Kingsbury, Manchester; Bruce R. Beckwith, Unionville; Frank P. Bares, New Hartford; Edward B. Gardner, Bloomfield, all of Conn.

[73] Assignee: Emhart Industries, Inc., Farmington, Conn.

[21] Appl. No.: 472,316

[22] Filed: Mar. 4, 1983

[51] Int. Cl.³ ................................................ C03B 7/14

[52] U.S. Cl. ........................................ 65/158; 65/163; 65/164

[58] Field of Search .......... 65/158, 163, 164, DIG. 13

[56] References Cited

U.S. PATENT DOCUMENTS

| | | | |
|---|---|---|---|
| 4,145,204 | 3/1979 | Farkas et al. | 65/163 X |
| 4,266,961 | 5/1981 | Wood | 65/163 X |
| 4,357,157 | 11/1982 | Cardenas-Franco et al. | 65/158 |

*Primary Examiner*—Arthur Kellogg
*Attorney, Agent, or Firm*—Gene Warzecha

[57] ABSTRACT

A timing control system for the gob delivery system of a glassware forming machine of the rotating table type. Gob timing functions provide means to determine the drop times of each gob within a group of gobs. Adjusting means are provided to adjust the drop times of selected gobs to equalize drop times of all gobs within a group of gobs being delivered.

7 Claims, 10 Drawing Figures

TIMING CONTROL SYSTEM FOR GLASSWARE FORMING MACHINE

BACKGROUND OF THE INVENTION

1. Field of the Invention

The invention relates generally to glassware forming machines of the rotating table type having a plurality of continuously rotating, circumferentially spaced forming units. More particularly, the invention relates to a timing control system for controlling the delivery of gobs of molten glass to the continuously rotating blank molds of the machine.

2. Description of the Prior Art

Glassware forming machines of the rotating table type are well known in the glassware manufacturing industry. One type of such machine is shown in U.S. Pat. No. 1,979,211 and is commonly referred to as the "Emhart H-28 Machine." This type of machine is a single table, continuous rotary motion machine having a plurality of individual sections or forming units mounted for rotation about the axis of the machine. These machines have been available with different numbers of individual forming units, thus constituting, for example, a 6, 12 or 18 section machine. In such H-28 machines each individual forming unit produces one glassware article for each complete revolution or cycle of the machine and will therefore be referred to herein as H-28 single gob machines.

A significant improvement over the H-28 single gob machine is disclosed in U.S. Pat. No. 4,339,264 which describes an H-28 double gob machine where each individual forming unit produces two glassware articles for each complete cycle. This patent is hereby incorporated by reference in this disclosure in its entirety.

One of the unique features of the prior art H-28 double gob machine is its delivery system, that is, the manner in which it guides or delivers gobs to the continuously rotating blank molds of the machine. Each set of inner and outer blank molds has associated with it a gob guiding unit consisting of a scoop, trough and deflector for guiding gobs into the blank molds. Each gob guiding unit oscillates over predetermined arcuate path about a delivery system axis parallel to the machine axis so that in one arcuate direction the speed of the deflector of the gob guiding unit approximates that of the continuously moving blank mold to facilitate gob delivery.

The delivery of gobs to the blank molds of a continuously rotating H-28 machine, whether single or double gob, is quite important. The gob must be delivered by the gob guiding unit while the blank molds are moving. In the H-28 single gob machine this may be accomplished by matching the arcuate speed of the gob guiding unit (in at least the direction where it moves with the blank) to that of the continuously moving blank mold. The same problem exists in H-28 double gob machines although compounded by the fact that, in addition to both gobs having to be delivered while the corresponding molds are moving, both gobs should be delivered at the same time with respect to each other.

In prior art H-28 double gob machines it was found that various factors influence the gob drop time (i.e. the time required for a gob to drop from the shears to its associated blank mold) so that even though two gobs may have been cut simultaneously they may not enter their corresponding blank molds simultaneously. This may result in defective ware being produced in one or both molds. This situation is somewhat exacerbated when arcuate shears are used since the gobs may then not even be cut simultaneously. Accordingly, it is an object of this invention to provide a means for determining the gob drop time of each gob within a group of gobs being delivered and for adjusting one or both of the gob drop times of subsequent gobs in order to equalize both drop times. It is also an object of this invention to provide means for synchronizing gob delivery and gob reject to the machine cycle.

SUMMARY OF THE INVENTION

These and other objects of this invention are achieved by the preferred embodiment which comprises a timing control system in a glassware forming machine of the rotating table type having a plurality of forming units for rotating about the axis of said machine. The machine has a delivery system comprising a plurality of gob guiding units each for periodically delivering a gob of glass to a corresponding blank mold rotating continuously about the axis of said machine, each said gob guiding unit comprising a scoop, a trough and a deflector. The timing control system comprises:

a first means for producing a first signal representative of the start of the drop of each gob;

a second means for detecting each gob near the end of its corresponding deflector for producing a second signal representative of the end of the drop of each of said gobs;

means responsive to the first and second signals associated with a respective one of said gobs for determining the gob drop time of each said gob;

display means for selectively displaying one of said gob drop times;

means for adjusting the gob drop time of a subsequent gob.

DESCRIPTION OF THE PREFERRED EMBODIMENT

Figure 1:
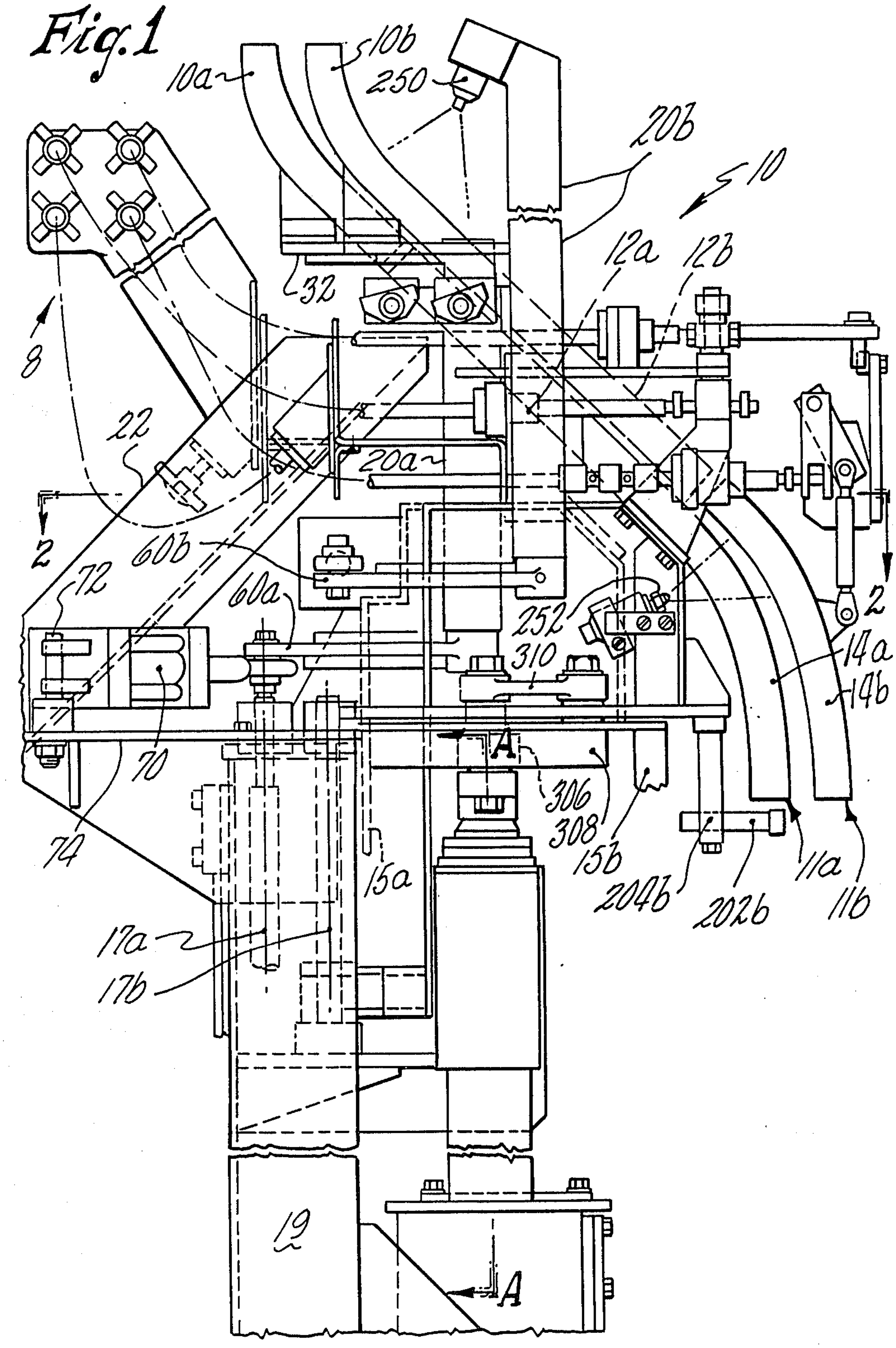
FIG. 1 is a partially cut away diagrammatic left side elevational view of a delivery system constructed in accordance with the principles of the invention.

Referring now to FIG. 1 there is shown a side elevational view of delivery system 10 which includes a pair of gob guiding units 11*a* and 11*b*, one associated with each feeder orifice (not shown). Each gob guiding unit includes a scoop 10, trough 12 and deflector 14. While the feeder orifices and shears are not shown it will be understood that the scoop of each gob guiding unit is situated under a feeder orifice to receive gobs as they are cut by the shears. The "a" series of components constitute the delivery components for the outer molds of the machine and the "b" components relate to the inner molds, the terms "inner" and "outer" indicating the relative radial positions of the blank molds with respect to the machine axis. While the preferred embodiment of the invention is described with reference to a double gob machine, it will be understood that the invention may be adapted for use with machines having more than two molds per forming unit.

FIG. 1 also shows a side elevational view of a deflector adjustment system 8 which is more particularly described in a co-pending application assigned to the assignee of the present invention.

Each gob guiding unit 11*a* and 11*b* includes a deflector and trough support frame 15*a* and 15*b*, respectively, and scoop support and pivot assemblies 20*a* and 20*b*, respectively. Each frame 15*a* and 15*b* is pivotally attached to main frame 19 to pivot about axes 17*a* and 17*b* respectively. For clarity, frame 15*a* is shown in phantom.

As in the prior art H-28 double gob machine disclosed in U.S. Pat. No. 4,339,264, each gob guiding unit oscillates about its respective pivot axis in order to move the deflectors along a path which approximately corresponds to a portion of the path of the continuously rotating blank molds. There are preferred times when the paths of the deflectors and blank molds overlap during which a gob can be delivered. As will be explained below, however, this invention constitutes an improvement over the prior art delivery system.

SCOOP PIVOT ASSEMBLY

One of the disadvantages of the prior art delivery system was its inability to move the scoops sufficiently out of the way to facilitate streaming with or without the orifice and to provide enough clearance for an easy orifice ring change. While the scoop was sufficiently pivotable about a horizontal axis to effect the gob reject function (clearing the gob to permit it to fall into a cullet chute), the clearance was inadequate for an orifice ring change. The present invention overcomes this disadvantage by providing scoop pivot assemblies 20*a* and 20*b* for pivoting each scoop out of the way about a vertical axis. This interrupts the feeding of selected gobs to the blank molds and permits the glass from the corresponding feeder orifice to fall directly into cullet chute 22. This pivoting motion of each scoop pivot assembly permits selective gob reject, as will be explained below, and also facilitates orifice ring change. The structure also permits a wider cullet chute than possible with the prior art design.

Scoop pivot assemblies 20*a* and 20*b* will be more clearly understood by reference to FIGS. 2, 3, 4 and 5. Since the operations of each scoop pivot assembly 20*a* and 20*b* are very similar, the description herein will refer primarily to scoop pivot assembly 20*a*.

Figure 2:
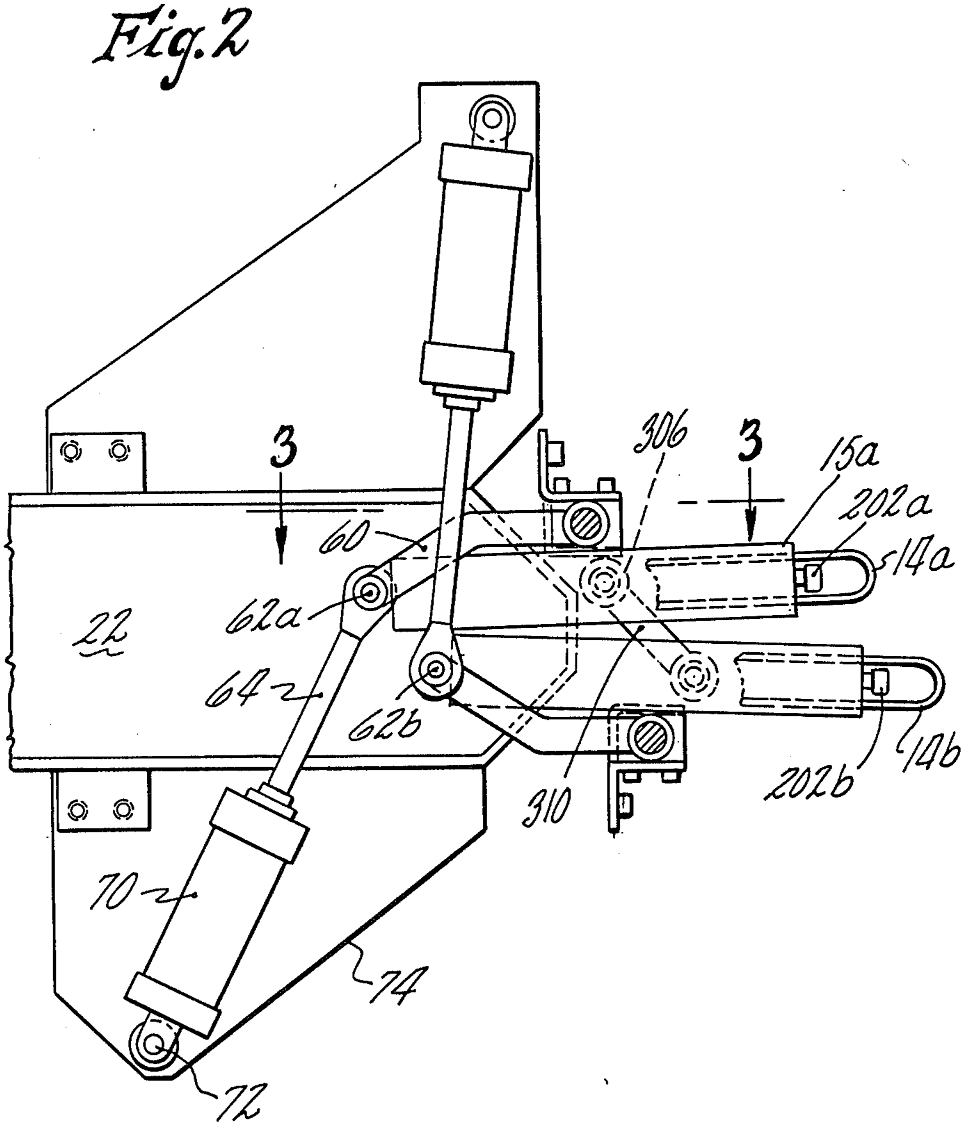
FIG. 2 is a diagrammatic plan view of a portion of FIG. 1 taken along the lines 2—2 with certain portions removed for clarity.

FIG. 2 shows a diagrammatic plan view of a portion of FIG. 1 and includes some elements merely outlined to show their relative positions and others omitted for clarity.

Figure 3:
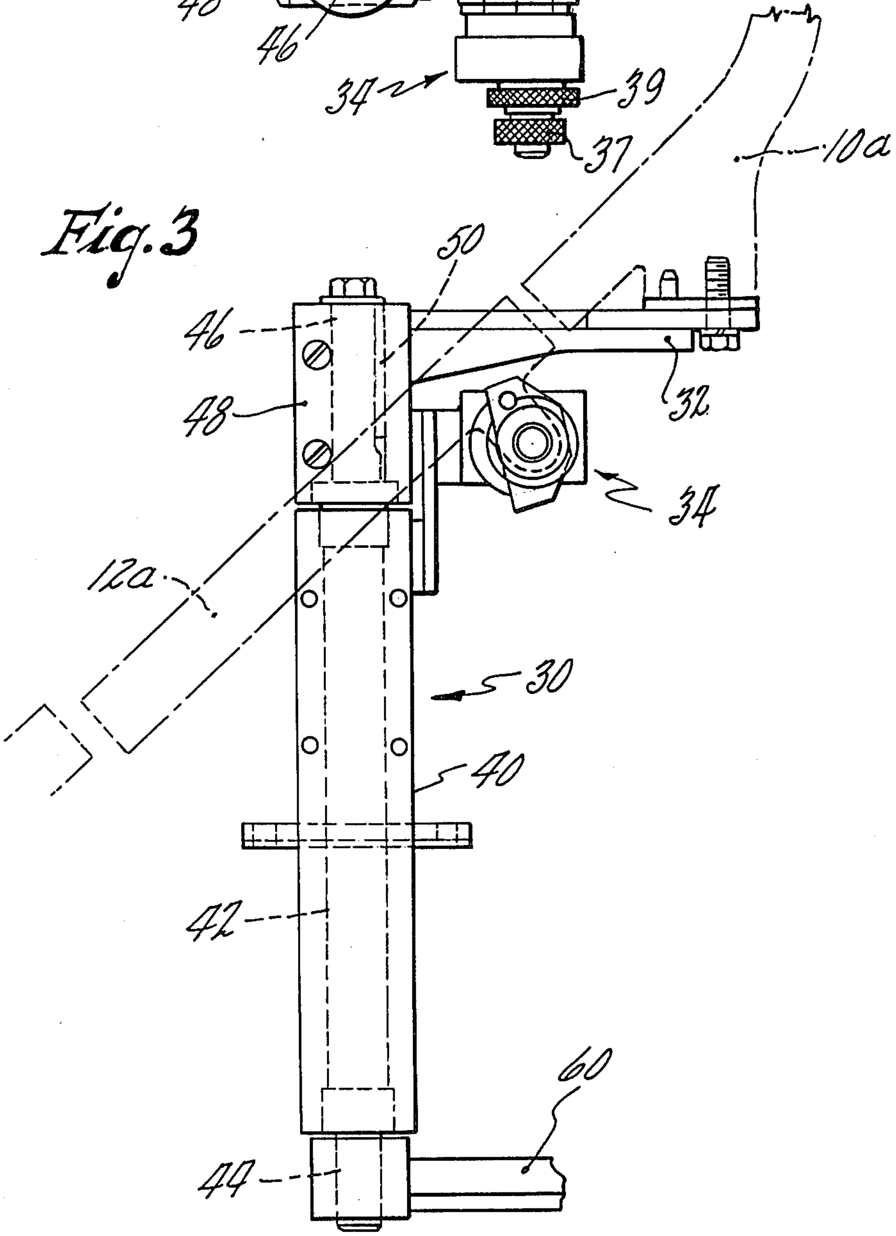
FIG. 3 is a side elevational view of a scoop pivot assembly taken along the lines 3—3 in FIG. 2.

As shown in FIG. 3, scoop 10*a* is supported in position beneath its corresponding feeder orifice (not shown) by pivot assembly 20 having a lateral support arm 32 (note that hereafter the "a" and "b" designations will generally not be used unless necessary to distinguish features of the inner and outer delivery means). Trough 12 is supported on trough support assembly 34 and is pivotable about shaft 35. It should be noted that FIG. 3 is an elevational view of FIG. 2 along the lines 3—3 although many components shown in FIG. 3 are omitted from FIG. 2 for clarity.

Trough support 34 has a pair of knurled controls 37 and 39 for adjusting shaft 35 to horizontally align the upper end of trough 12 with scoop 10. Trough support 34 also has a detented knob which is rotated to vertically align the upper end of trough 12 with scoop 10.

Figure 4:
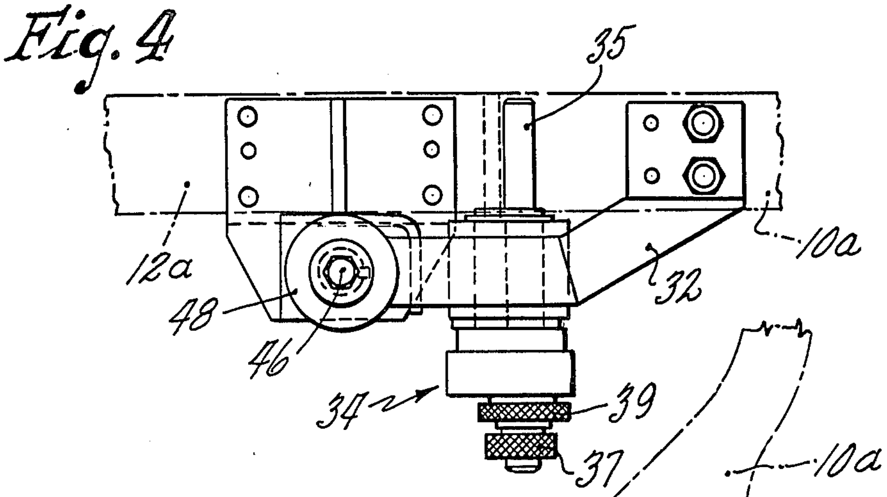
FIG. 4 is a plan view of FIG. 3.

Pivot assembly 20 comprises a fixed outer portion 40 secured to frame 15 of its corresponding gob guiding unit (by means not shown) and an inner rotatable shaft 42 having a lower end 44 and an upper end 46. Lateral support arm 32 is secured to an upper housing 48 which is keyed at 50 to upper shaft end 46 and, as best seen in FIG. 4, has a dog leg shape in order to accommodate trough 12 and align it with scoop 10.

The lower shaft end 44 is secured to a similarly dog leg shaped link 60, best seen in FIG. 2, the other end of which is pivotably secured about axis 62 to rod 64 of piston and cylinder assembly 70. Cylinder 70 is pivotably secured at axis 72 to frame member 74 which is secured to main frame 19. Cylinder 70 is a conventional air cylinder assembly the piston of which is connected to rod 64 which is shown in its fully retracted position in FIG. 2.

Figure 5:
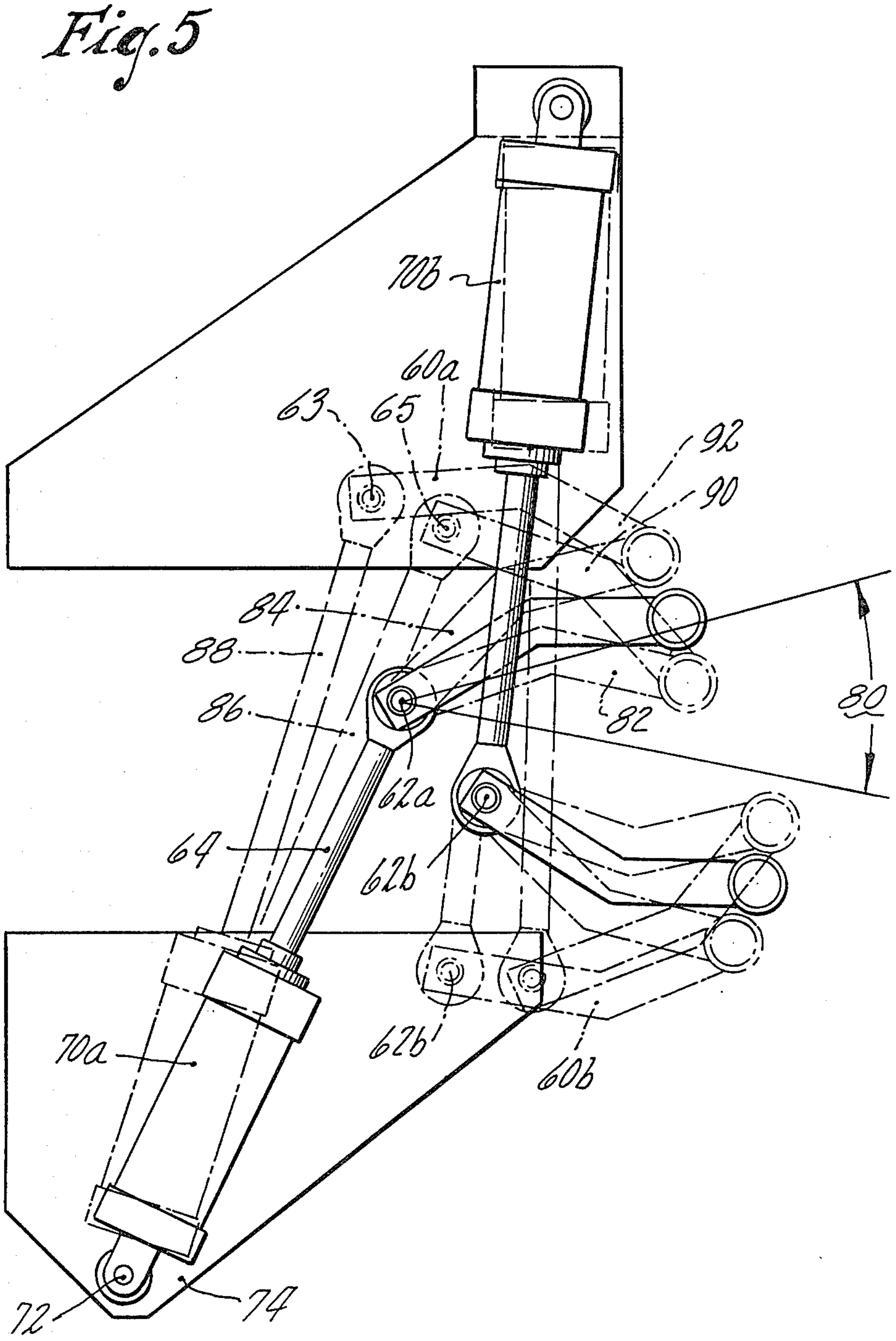
FIG. 5 is a diagrammatic view of a portion of FIG. 2 showing the positions of various members at various points in the delivery cycle.

Referring now to FIG. 5, air cylinders 70*a* and 70*b* are shown in fully retracted positions in solid lines and in fully extended positions in phantom. Dog links 60*a* and 60*b* are shown in positions corresponding to the retracted and extended positions of rods 64 and pivot shafts 42 are shown in positions corresponding to the oscillatory motion of frames 15*a* and 15*b*.

By reference to FIGS. 2 and 3 it will be understood that link 60 and arm 32 are essentially parallel (although, as best seen in FIG. 1, at different levels relative to their respective pivot assembly) and extension of rod 64 will cause lateral support arm 32 to pivot about the axis of shaft 42, thus moving corresponding scoop 10 from underneath its corresponding orifice, permitting streaming or gob rejection into cullet chute 22. Note that each axis 62*a* and 62*b* is aligned with its respective feeder orifice and pivot axes 17i a and 17*b*, respectively, when the pistons are fully retracted. Cylinder 70 is actuated by gob reject means (explained below) in order to cause the corresponding scoop to move from a delivery position to a gob reject position. These positions of the scoop may be equated to the positions of dog link 60 shown in FIGS. 2 and 5. The delivery position of a scoop is that in which it is under its orifice and the reject position is that in which it is swung away.

Referring now to FIG. 5 the delivery and reject positions of cylinders 70*a* and 70*b* and associated components are shown superimposed upon the oscillating motion of frames 15*a* and 15i b. It is understood that frame 15*a* normally oscillates along arc 80 and frame 15*b* similarly oscillates but along a slightly shorter arcuate path (not shown). When there is no gob reject signal, cylinder 70 will keep rod 64 in its retracted position causing dog link 60 to oscillate between positions 82 and 84. This motion keeps the scoop aligned with its orifice at all times even though frame 15 is oscillating. When a gob reject signal activates cylinder 70 the arcuately oscillating motion of dog link 60 and corresponding arm 32 is superimposed upon the motion of extended rod 64 causing it to oscillate between positions 86 and 88 as frame 15 oscillates through its normal path, thus causing the end of rod 64 to oscillate between points 63 and 65 as shown. This oscillatory motion of dog link 60 (and corresponding lateral support arm 32) between positions 90 and 92 does not affect the gob reject function since at both extremes of this oscillatory motion the scoop is removed from beneath its corresponding orifice.

GOB DELIVERY TIMING

Figure 6:
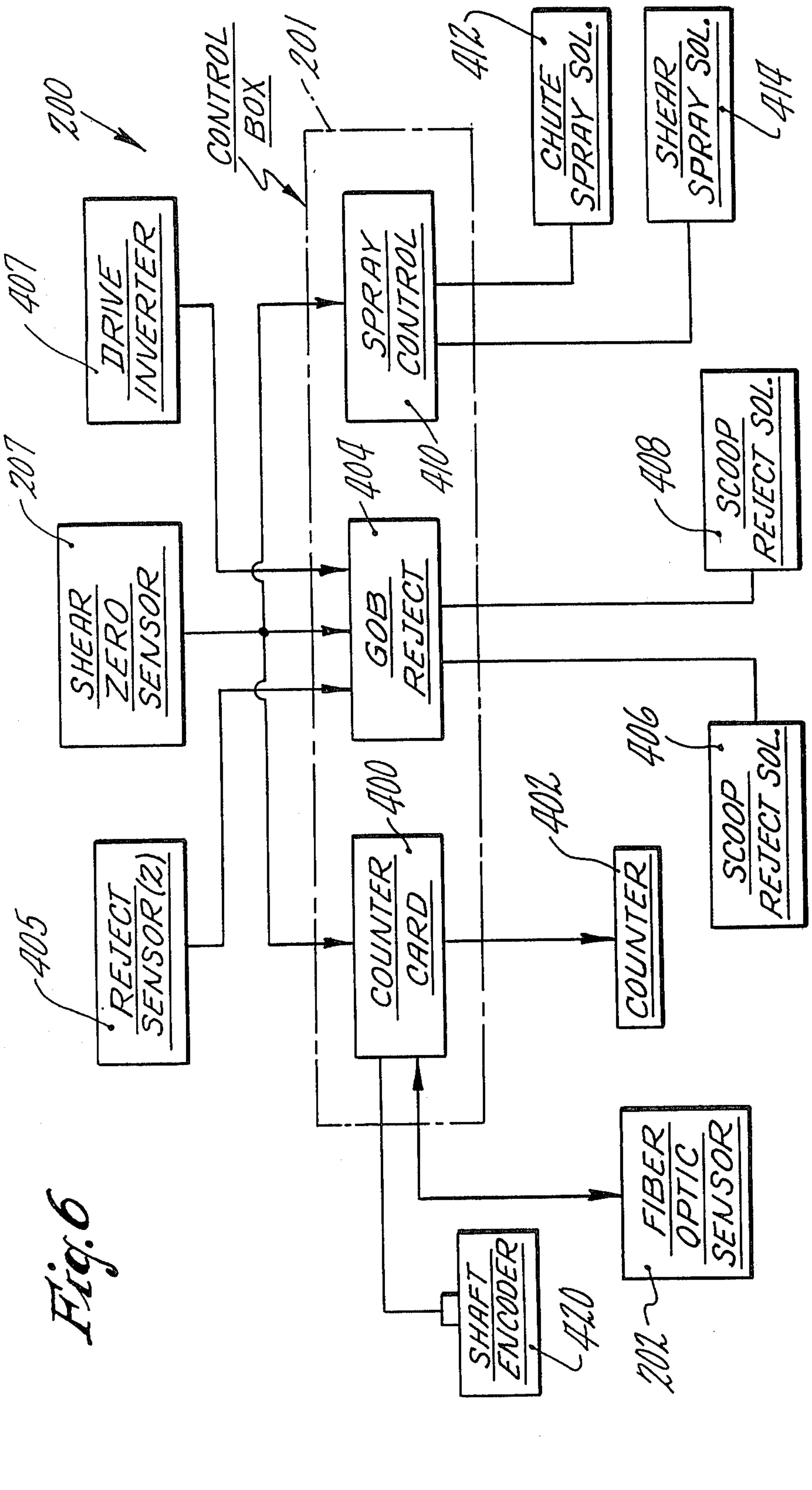
FIG. 6 is a schematic circuit diagram of a timing control circuit for the delivery system.
Figure 7:
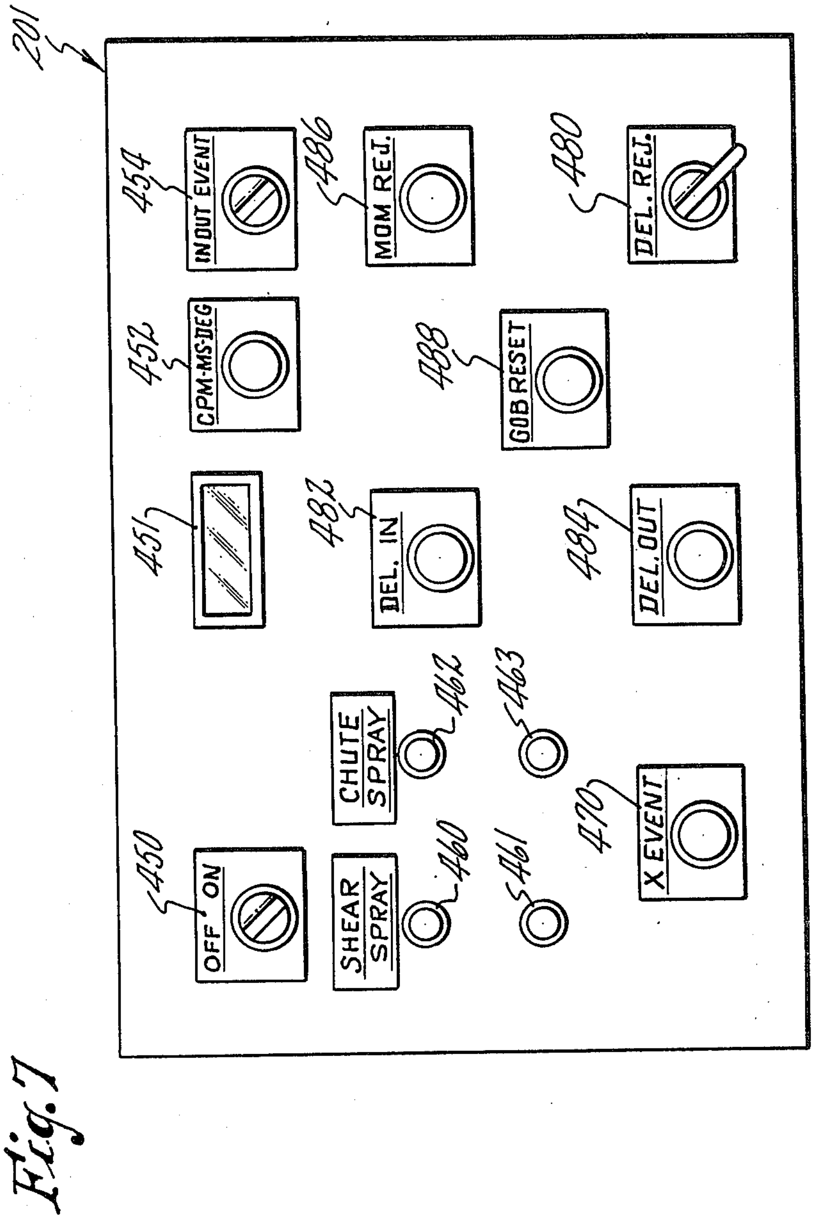
FIG. 7 is a front elevational view of the control panel of the circuit shown in FIG. 6.

Delivery system 10 includes gob delivery timing control system generally designated by the numeral 200 and schematically illustrated in FIG. 6. Timing control system 200 includes control box 202 (best seen in FIG. 7) and generally provides a means for performing three functons: (1) gob reject and timing, (2) gob synchronization and (3) diagnostics for determining selected time periods.

Timing control system 200 comprises five main subcircuits housed in control box 201, each primarily performing a discrete function, and a variety of associated sensors and actuating mechanisms mounted in various places on the machine. Counter printed circuit 400 provides the control of counter display 402, gob reject printed circuit 404 controls scoop reject solenoids 406 and 408 and spray control printed circuit 410 controls chute spray solenoid 412 and shear spray solenoid 414. An input/output circuit board (not shown) provides optical coupling interface and necessary power supplies. A diagnostic board (also not shown) provides a means to use display 402 to determine the value of selected time intervals in the operation of the machine cycle and also provides a means to simulate machine operation.

The gob timing function is achieved primarily through the use of counter circuit 400 and spray control circuit 410. In performing this function control system 200 determines the drop time of each gob and facilitates adjustment of the water spray on the scoop and trough of one or the other gob in order to equalize the drop times of subsequent gobs. Alternatively, automatic means may be used to automatically adjust the water spray to equalize drop times without the need for operator intervention.

Figure 9:
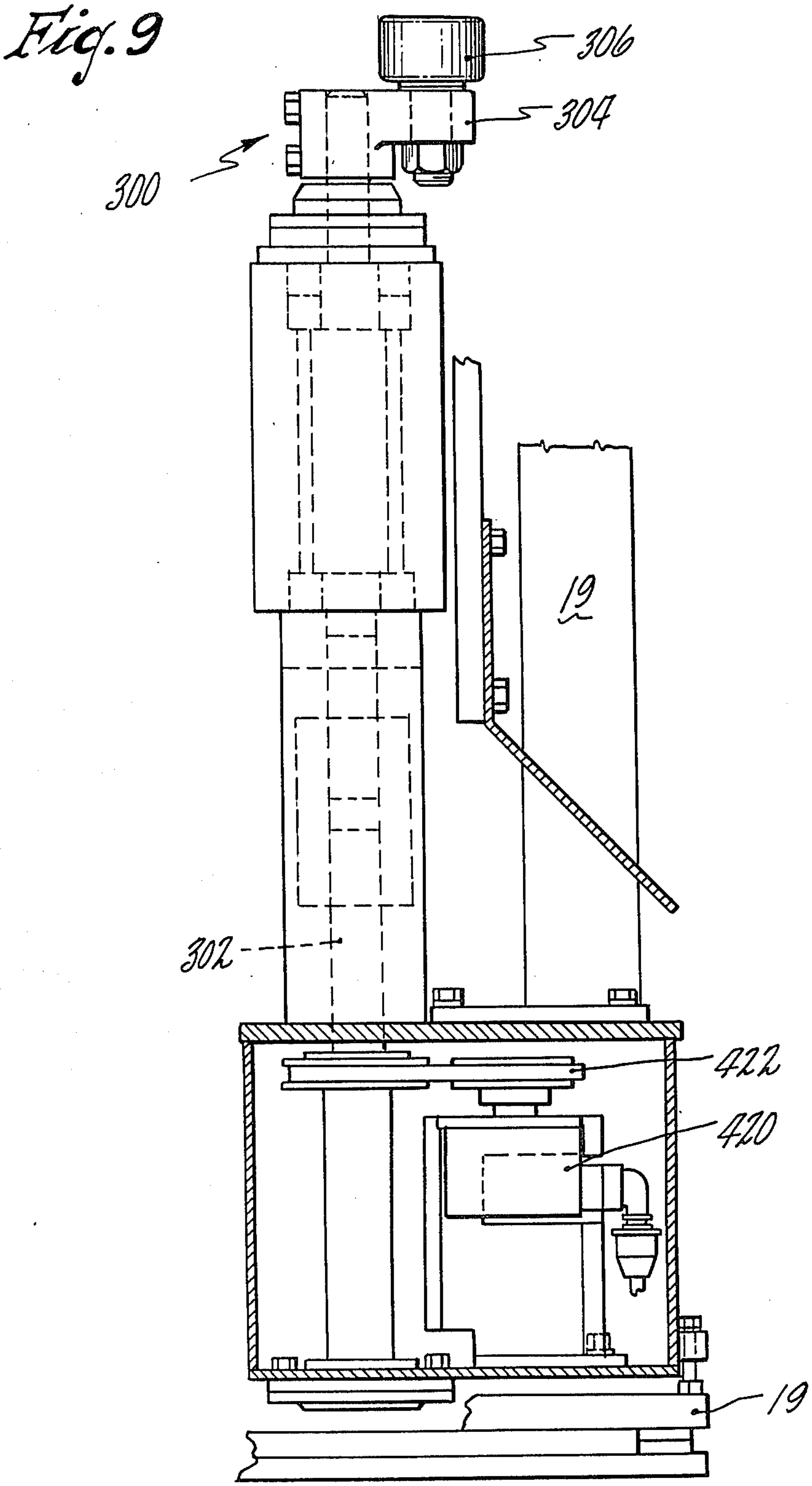
FIG. 9 is a cross sectional view of a portion of FIG. 1 taken the lines A—A.

In one embodiment shear sensor 207 provides a drop start signal at the end of the shear cut. The shear sensor may be of conventional design such as a Hall effect sensor and a corresponding zero lug mounted on a rotating part of the shears to produce a signal indicating the start of the gob drop. Assuming both shears work simultaneously (as in straight line shears) the start of the gob drop for each gob is the same. This is not necessary and the invention works equally well with arcuate shears. In another embodiment an encoder 420, best seen in FIG. 9, is connected to the delivery system drive shaft by timing belt and pulley arrangement 422 and is used to determine the start of the gob drop. In the preferred embodiment encoder 420 produces one sync or zero pulse per delivery cycle and 720 intermediate pulses, the zero pulse arbitrarily being chosen to occur 97.5° before the synchronization of the delivery cycle with the blank molds. The encoder need not be synchronized to the shear. That is, the zero pulse of the encoder need not occur when the shear pulse occurs. Since an arbitrary gob drop time may be started from the encoder zero pulse the drop time determined by the counter circuit 400 may not be an absolute value, cut rather a relative value. Alternatively, if the shear sensor is used to start calculating the drop time, the displayed drop time would be actual.

Whether a shear sensor or encoder is used, the end of the gob drop time is sensed by infrared or optical gob sensor 202, best seen in FIG. 1, mounted on frame 15 in such a way as to view the gob just before it drops into the blank mold. For clarity, only one gob sensor 202 is shown in FIG. 1 although it will be understood that each deflector has a corresponding gob sensor, diagrammatically shown in FIG. 2. For clarity, pneumatic blow off tubes for blowing water away from the gob path just before the blank molds are not shown.

Figure 8:
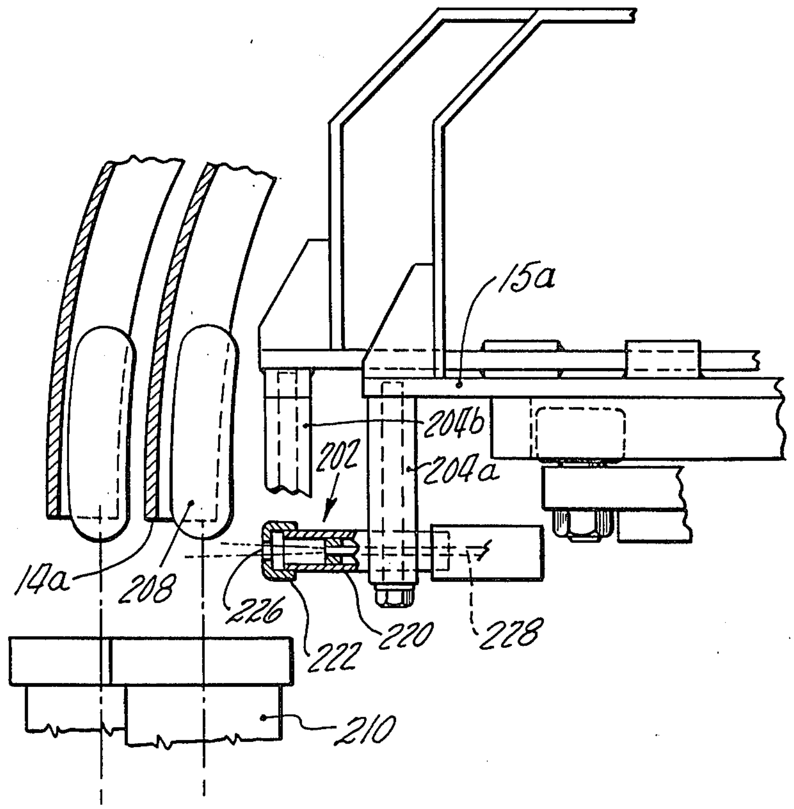
FIG. 8 is a diagrammatic cross-sectional side elevational view of a gob sensing unit mounted near the end of the deflectors.

As diagrammatically shown in FIG. 8, inner gob sensor **202*a* is secured to frame 15*a* via gob sensor bracket 204*a* in such a way as to view gob 208 below deflector 14*a* and before it enters its corresponding mold 210. Viewing port 226 provides the restricted field of view for fiberoptic cable 228 which is conventionally secured axially within housing 220. The other end of cable 228 is connected to a photo sensor (not shown) for producing a signal whenever a gob falls within the field of view of gob sensor housing 202**.

In the prior art machines the chutes and shears were sprayed continuously. This in addition to being wasteful was not effective in adjusting the individual gob drop times. In the prior art the adjustment of individual gobs was also a rather complex procedure requiring adjustment of the water spray, inspection of the feeder, etc. The invention greatly facilitates this adjustment and further provides means for controlling gob drop time. Water spray nozzles 250 and 252, best seen in FIG. 1, are actuated by solenoids 412 and associated with each gob guiding unit to spray each delivery path to adjust the gob drop time as a function of the time determined by system 200. Spray nozzle 250 is oriented to spray a predetermined amount of atomized water onto an associated scoop in response to a signal from circuit 201. Similarly, spray nozzle 252 is oriented to spray atomized water on an associated deflector. Generally, both spray nozzles will be actuated simultaneously by solenoid 412 and in an elliptical spray pattern to reduce overspray. Since there is a limited time in which to load both blank molds because of their continuous rotation the object of the spray system is to lubricate the delivery paths so that both gob drop times are equalized.

The circuits within system 200 are of conventional design well known to those skilled in the art. Therefore, the operation of the invention will be described by reference to FIGS. 6 and 7 and an explanation of the function of the operator controls available on the face of circuit box 201.

Power switch 450 applies power and initializing inputs to the various parts of system 200. Digital display 451 is used by the operator to display the gob drop time of either the inner or outer gobs or to display the number of bottles formed per minute by the machine. The CPM-MS-DEG selector switch 452 causes display 451 to show either counts per minute, or gob drop time or event time in milliseconds or degrees. The MS and DEG positions are used in conjunction with the IN-OUT-EVENT switch 454 to display the gob drop time in milliseconds, or alternatively in degrees, of the inner or outer gobs. When in the "event" position the display will show the time duration of the chosen "X" event useful for diagnostic purposes (explained below).

During operation of system 200 encoder 420 produces a zero sync pulse for each section of the machine. As stated above, the zero pulse occurs 97.5° before synchronization which occurs approximately when the deflectors are over their corresponding blank molds. Counter circuit 400 converts the 720 intermediate encoder pulses into degrees of machine cycle and uses this information to display the gob drop time in degrees. Alternatively, a crystal clock is enclosed in the circuit to produce the time in milliseconds if desired. The display counter operates in a standard fashion by accepting pulse inputs from the counter card, latching the count in response to a signal from gob sensors 202 and resetting the counter in order to determine the next subsequent gob drop time while maintaining the display for a short time.

The signal from shear zero sensor 207 is used to latch the counter for the "cuts per minute" function. The actual display may be bottles per minute which is actually double the cuts per minute because it is a double gob machine.

Gob reject circuit 404 receives an input from gob reject sensors 405, shear zero sensor 207 and from a drive inverter 407. Two gob reject sensors are associated with the machine for sensing corresponding switches on each rotating forming unit at a point upstream from the delivery system. The sensors produce gob reject signals if the switches are set in a reject position. The outputs from gob reject circuit 404 are the signals to the respective scoop reject solenoids 406 and 408. The shear zero signal is required to determine exactly when after the reject sensors are tripped that a gob should be rejected. The reject sensors are located approximately a section and a half before the delivery reject position and therefore an appropriate time period must pass before the scoop reject solenoids are caused to reject a gob.

The spray control circuit 410 receives an input from shear zero sensor 207 which triggers a plurality of timers to determine the time and length of spray for the chutes (i.e. scoop and deflector) and the shears. The operator adjusts potentiometers 460 and 461 to control the time and length of shear spray and adjusts potentiometers 462 and 463 to control time and length of chute spray. The operator determines the desired time by merely noting that the gob drop times of one of the gob guiding units is changing unsatisfactorily (either decreasing or increasing). Alternatively, means could be employed in the circuit to automatically equalize the gob drop time.

The adjustment of gob drop times may need to be accomplished over the course of several delivery cycles by making an adjustment and observing the effect.

The X-EVENT switch 470 is generally used for diagnostic purposes to provide data relating to a variable event. As best seen diagrammatically in FIG. 10 one or more X-EVENT sensors 472 may be provided on a rotating part of the machine. A plurality of sensors are built into the machine and connecting wires therefrom routed to a conveniently located junction box 474. Activation of any one of these sensors is achieved by connecting a selected lead to the counter board in control box 201. By selecting the "event" setting on switch 454 a counter on the counter board receives a start signal from shear sensor 207 and a stop signal from the selected and activated X-EVENT. The time interval is then displayed on display 451. Alternatively, the start signal could come from button 470.

When the DEL-REJ switch 480 is in the continuous reject position, the DEL-IN button 482 and DEL-OUT button 484 may be used to override and selectively deliver inner or outer gobs to a chosen section so long as the button is depressed. When switch 480 is in the delivery position the gob reject function is controlled by reject sensors 405 and MOM-REJ button 486 to override it and momentarily reject both gobs from a chosen section. The GOB-RESET button 488 initializes the machine and control system and properly positions the scoop reject mechanism after the machine has been shut down.

The control system also facilitates synchronizing gob delivery to machine rotation after both gob drop times are equal.

It will be understood by those skilled in the art that although th gob guiding units oscillate, the delivery system drive means rotates through 360° while each section of the machine rotates through 1/12 of a full circle (for a 12 section machine). At a predetermined point in each delivery cycle the deflectors will be directly over their respective blank molds of the particular forming unit then receiving gobs. This predetermined point in the delivery cycle thus corresponds to another predetermined point in the machine cycle, each point being significant relative to the other but individually arbitrary. That is, in the preferred embodiment the deflectors were empirically determined to be synchronized with the machine at 97.5° of the delivery cycle. It is at this point that the gobs should be at the top of their respective blank molds and detected by sensors 202. The operator may determine on a case-by-case basis what the displayed drop time should be to achieve proper sync.

It is possible to achieve more than one sync point during the delivery cycle where the deflectors are over their corresponding blank molds by making the arcuate velocity of the deflectors slightly higher than that of the blank molds in the area of overlap. For example, a 1% differential may produce three sync points depending on the extent of overlap. Actually, gob delivery may occur anywhere in the overlap region as selected by the operator. Fine adjustments to ensure proper deflector orientation may be accomplished by the deflector adjustment system 8.

Regardless of how many sync points there are, the synchronization of the delivery cycle is effected by the operator viewing one of the gob drop times (inner or outer) since at this point they should be equal and advancing or retarding the shear drive motor to change the start time of the gob drop accordingly. Fine sync adjustments are also made with deflector adjustment system 8.

Figure 10:
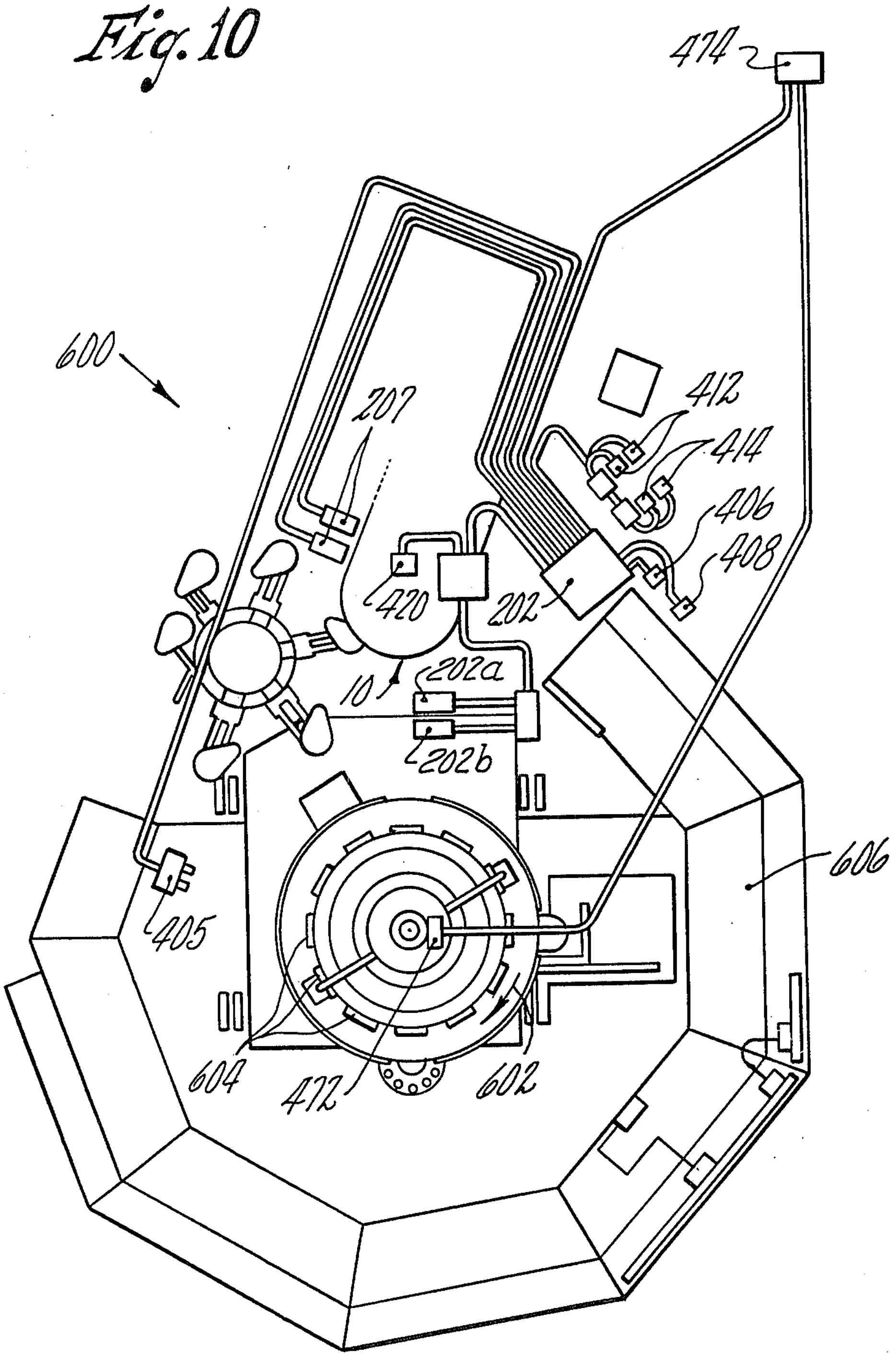
FIG. 10 is a diagrammatic plan view of an H-28 double gob machine showing the locations of the various parts of the invention.

The relationship of the various parts of the invention will best be understood by reference to FIG. 10 which diagrammatically shows a plan view of an H-28 double gob machine 600. In operation, the machine rotates in direction 602 and includes a plurality of circumferentially spaced forming units 604. The machine includes a platform 606 to provide operator accessability to the various components. Several of the parts described herein are included in FIG. 10 to their relative placement. However, the relative placement of several of the sensors and actuators associated with control box 201 cannot be properly shown in a plan view and these items are shown outside their normal locations. Those skilled in the art will understand that numerous modifications and improvements may be made to the preferred emmbodiment of the invention disclosed herein without departing from the spirit and scope thereof.

What is claimed is:

1. In a glassware forming machine of the rotating table type having a plurality of forming units for rotating about the axis of said machine said machine having a delivery system comprising a plurality of gob guiding units each for periodically and substantially simultaneously delivering a gob of glass to a corresponding blank mold rotating continuously about the axis of said machine, all gobs being substantially simultaneously delivered being termed a group of gobs, each said gob guiding unit comprising a scoop, a trough and a deflector, a timing control system comprising:

a first means for producing a first signal representative of the start of the drop of each gob within a group;

a second means for detecting each gob near the end of its corresponding deflector for producing a second signal representative of the end of the drop of each of said gobs;

means responsive to the first and second signals associated with a respective one of said gobs within said group for determining the gob drop time of each gob within said group;

display means for selectively displaying one of said gob drop times.

2. An apparatus according to claim 1 further comprising:

means associated with a gob guiding unit for adjusting the gob drop time of a subsequent gob to be delivered thereby.

3. An apparatus according to claim 1 wherein said first means is a shear sensor and said first signal corresponds to the end of a shear cut.

4. An apparatus according to claim 1 wherein said first means comprises an encoder synchronized to the cycle of said delivery system.

5. An apparatus according to claim 1 wherein said second means comprises:

a housing provided with a viewing aperture having a predetermined field of view for viewing a gob below a corresponding deflector;

a fiberoptic cable secured within said housing for communicating the view of said viewing aperture to a predetermined location;

a photo detector at said predetermined location for detecting a gob in said field of view and for producing said second signal.

6. An apparatus according to claim 2 wherein said means for ajusting comprises:

a water spray apparatus mounted relative to said corresponding gob guiding unit for spraying a predetermined amount of water on predetermined portions thereof to selectively adjust the gob drop time of gobs guided thereby.

7. An apparatus according to claim 2 further comprising:

means responsive to said gob drop time determining means and operatively associated with said adjusting means for equallizing the gob drop times of each gob within each group.

* * * * *